(12) United States Patent
Kim et al.

(10) Patent No.: US 11,829,558 B1
(45) Date of Patent: Nov. 28, 2023

(54) CAPACITIVE TOUCH SCREEN CALIBRATION

(71) Applicant: STMicroelectronics Asia Pacific Pte Ltd., Singapore (SG)

(72) Inventors: Min Sang Kim, Anyang-si (KR); Chan Hyuck Yun, Yongin-si (KR); Sang Hoon Jeon, Seoul (KR); Jeonghee Son, Suwon-si (KR); Yun Sang On, Yong In (KR)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 17/961,045

(22) Filed: Oct. 6, 2022

(51) Int. Cl.
*G06F 3/041* (2006.01)
*G06F 3/044* (2006.01)
*H04M 1/02* (2006.01)

(52) U.S. Cl.
CPC ........ *G06F 3/0418* (2013.01); *H04M 1/0266* (2013.01); *G06F 3/0446* (2019.05); *H04M 2201/38* (2013.01); *H04M 2250/22* (2013.01)

(58) Field of Classification Search
CPC ...... G06F 3/0418; G06F 3/0446; G06F 3/044; G06F 3/041; H04M 1/0266; H04M 2201/38; H04M 2250/22
See application file for complete search history.

(56) References Cited

U.S. PATENT DOCUMENTS

| | | | | |
|---|---|---|---|---|
| 2010/0244859 A1* | 9/2010 | Cormier, Jr. | .......... | G06F 3/0446 324/678 |
| 2010/0321307 A1* | 12/2010 | Hirokawa | ............. | G06F 3/0418 345/173 |
| 2017/0010717 A1* | 1/2017 | Kim | ...................... | G06F 3/0446 |
| 2022/0247420 A1* | 8/2022 | Rajagopal | ........... | H03M 1/0624 |

* cited by examiner

*Primary Examiner* — Md Saiful A Siddiqui
(74) *Attorney, Agent, or Firm* — Slater Matsil, LLP (57) ABSTRACT

In an embodiment, a method includes performing a calibration of a first touch cell of a touch screen, where performing the calibration includes: receiving a first code associated with the first touch cell; receiving a second code associated with the first touch cell; determining whether there is an indication of a touch of the touch screen based on the first and second codes; generating a raw code based on the first or second codes; receiving a third code associated with the first touch cell; determining whether the third code matches the raw code; and in response to determining that there is no indication of a touch of the touch screen based on the first and second codes, and that the third code matches the raw code, updating a calibration code associated with the first touch cell based on the raw code or the third code.

20 Claims, 5 Drawing Sheets

CAPACITIVE TOUCH SCREEN CALIBRATION

TECHNICAL FIELD

The present disclosure relates generally to an electronic system and method, and, in particular embodiments, to a capacitive touch screen calibration.

BACKGROUND

Touch screens are commonly used as an interface mechanism for electronic devices, such as tables, smartphones, and computers. Touch screens combine a display to provide outputs with a touch panel to capture inputs. The touch panel may be implemented, for example, as a resistive touch panel or as a capacitive touch panel.

Capacitive-type touch screens use capacitive sensors to detect touch. For example, a capacitive-type touch screen may include an array of capacitive sensors, where the capacitance of the capacitive sensors changes as a function of the proximity of a conductive object (such as a finger or stylus) to the capacitive sensor. The location of a touch in a capacitive-type touch screen may be determined, e.g., by identifying the location of the capacitor(s) exhibiting a capacitance change.

As an example, a capacitive-type touch screen based on mutual capacitive sensing may include a sensing grid having a plurality of rows and columns. A touch controller may drive each of the rows of the grid in a known manner and determine changes in capacitance by sensing the columns of the grid. For example, the change in capacitance may be determined by a change in voltage, e.g., as reported by an analog-to-digital converter (ADC) of the touch controller. Thus, a touch screen grid may have, at any given time, an ADC code $Code_{curr}$ associated with each touch cell of the grid.

Figure 1:
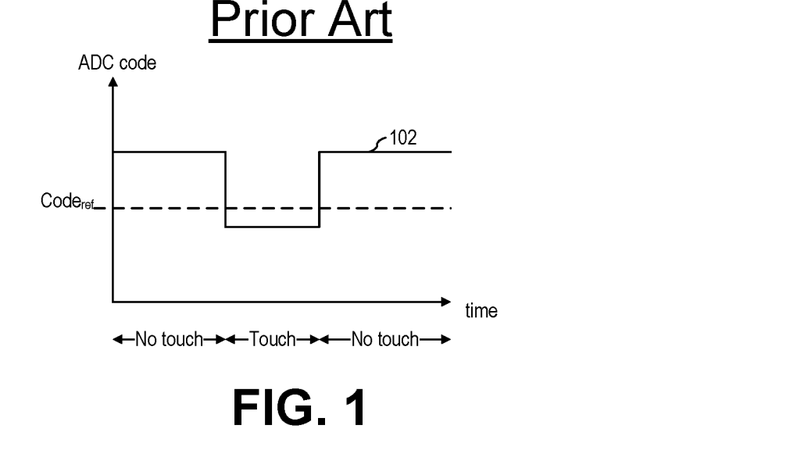
FIG. 1 shows a plot illustrating an exemplary touch detection at given touch cell of a grid of a capacitive-type touch screen.

FIG. 1 shows a plot illustrating an exemplary touch detection at given touch cell of a grid of a capacitive-type touch screen. As shown by curve 102, the voltage, as reported by an ADC as an ADC code $Code_{curr}$, is monitored for the given touch cell. When the ADC code $Code_{curr}$ of the given touch cell changes by more than a (e.g., predetermined) value, such as drops below a predetermined threshold code $Code_{ref}$, a touch is detected at the location of the touch cell. Such procedure may be performed (e.g., in parallel) for each touch cell of the grid, by the touch screen controller.

SUMMARY

In accordance with an embodiment, a method includes performing a calibration of a first touch cell of a touch screen, where performing the calibration includes: receiving a first code associated with the first touch cell; receiving a second code associated with the first touch cell; determining whether there is an indication of a touch of the touch screen based on the first and second codes; generating a raw code based on the first or second codes; receiving a third code associated with the first touch cell; determining whether the third code matches the raw code; and in response to determining that there is no indication of a touch of the touch screen based on the first and second codes, and that the third code matches the raw code, updating a calibration code associated with the first touch cell based on the raw code or the third code.

In accordance with an embodiment, a device includes: a touch screen that includes an array of touch cells; and a controller configured to perform a calibration of a first touch cell of the array, where performing the calibration includes: receiving a first code associated with the first touch cell, receiving a second code associated with the first touch cell, determining whether there is an indication of a touch of the touch screen based on the first and second codes, generating a raw code based on the first or second codes, receiving a third code associated with the first touch cell, determining whether the third code matches the raw code, and in response to determining that there is no indication of a touch of the touch screen based on the first and second codes, and that the third code matches the raw code, updating a calibration code associated with the first touch cell based on the raw code or the third code.

In accordance with an embodiment, a system configured to be coupled to a touch screen that includes an array of touch cells includes: a memory; and a controller configured to perform a calibration of a first touch cell of the array, where performing the calibration includes: receiving a first code associated with the first touch cell, receiving a second code associated with the first touch cell, determining whether there is an indication of a touch of the touch screen based on the first and second codes, generating a raw code based on the first or second codes, receiving a third code associated with the first touch cell, determining whether the third code matches the raw code, and in response to determining that there is no indication of a touch of the touch screen based on the first and second codes, and that the third code matches the raw code, updating a calibration code associated with the first touch cell based on the raw code or the third code, and storing the updated calibration code in the memory.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., an after-market calibration of a capacitive-type touch screen of a device, such as a smartphone or tablet. Embodiments of the present invention may be used in other types of devices, other types of touch screens, and/or other types of touch sensing elements, such as capacitive-type touch sense buttons.

In an embodiment of the present invention, a device having a touch screen is advantageously capable of dynamically adapting to environmental changes, such as changes in temperature, for example. The touch screen is advantageously capable of avoiding ghost detections by using a reset mechanism based on calibration data. After-market calibration may be performed (e.g., by a user of the device) to rewrite the calibration data to correct ghost detection that may be caused, e.g., by aging of the touch screen.

In some embodiments, a touch is identified when the code associated with a given touch cell of a grid of a touch screen changes by more than a predetermined amount (where the code is indicative of the capacitance of the given touch cell). The capacitance and other properties of each touch cell of the grid may shift with environmental conditions such as temperature for example.

Figure 2:
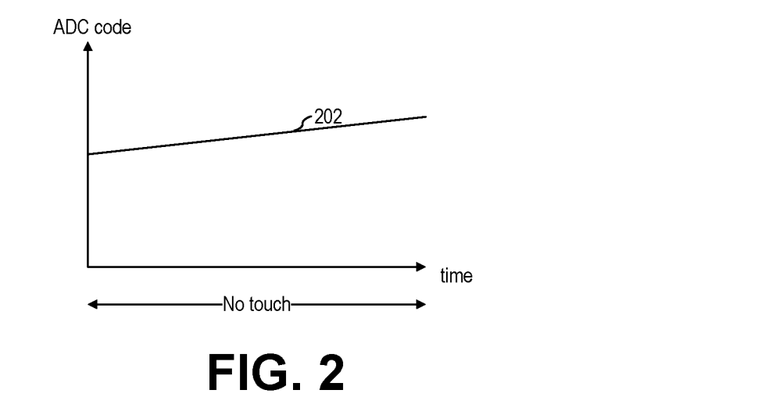
FIG. 2 shows a plot illustrating exemplary variations of the code at given touch cell of a grid of a capacitive-type touch screen.

FIG. 2 shows a plot illustrating exemplary variations of the code at a given touch cell of a grid of a capacitive-type touch screen. As shown by curve 202, the code associated with the given touch cell may (e.g., slowly, such as in minutes or hours) drift higher (or lower) based on changes in environmental conditions. Thus, the code associated with a given touch cell may vary with time without being caused by a touch of the given touch cell. Thus, using a fixed threshold code to identify a touch may be impractical, and may result in false positives.

Figure 3:
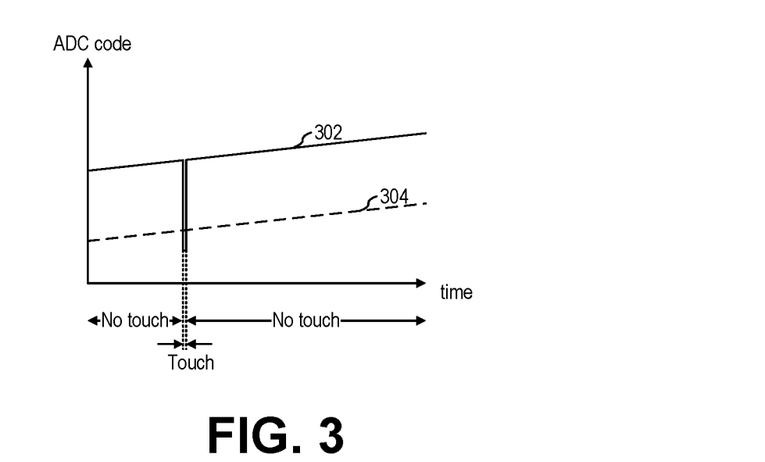
FIG. 3 illustrates the change in the threshold code over time, according to an embodiment of the present invention.

In some embodiments, the threshold code $Code_{ref}$ associated with a given touch cell dynamically changes based on the, e.g., recent, history of ADC codes $Code_{curr}$ associated with the given touch cell. For example, in some embodiments, the threshold code $Code_{ref}$ associated with a given touch cell is the low-pass filtered and offset version of the ADC code $Code_{curr}$ of the given touch cell. For example, FIG. 3 illustrates the change in threshold code $Code_{ref}$ over time, according to an embodiment of the present invention. Curve 302 shows the ADC code $Code_{curr}$ associated with a given touch cell. Curve 304 shows the threshold code $Code_{ref}$ associated with the given touch cell.

As shown in FIG. 3, in some embodiments, curve 304 follows curve 302. For example, in some embodiments, curve 304 may be a delayed and offset version of curve 302, with touch instances ignored for purposes of determining curve 304. By dynamically adjusting the threshold code $Code_{ref}$ associated with a given touch cell based on the ADC code $Code_{curr}$ of the given touch cell, some embodiments are advantageously capable to adapt to changes in environmental conditions and avoid ghost touches (touch detections not associated with a touch action) associated with gradual changes in the ADC code $Code_{curr}$.

In some embodiments, the threshold code $CODE_{ref}$ is determined for each touch cell of the grid, and stored for comparison to determine whether a touch is detected or not at one or more locations of the grid. In some embodiments, a baseline code $CODE_{base}$ is stored for each touch cell of the grid, and the threshold code $CODE_{ref}$ is calculated based on the baseline code $CODE_{base}$ (e.g., by adding an offset to baseline code $CODE_{base}$).

In some embodiments, the baseline code $CODE_{base}$ of each touch cell of the grid is the low-pass filtered version of the ADC code $Code_{curr}$ of the respective touch cell of the grid.

Figure 4:
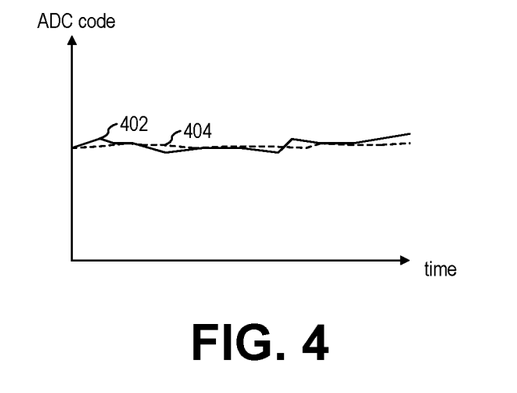
FIG. 4 shows, for a given touch cell of a grid of a touch screen, curves illustrating the ADC code and the baseline code, according to an embodiment of the present invention.

FIG. 4 shows, for a given touch cell of a grid of a touch screen, curve 402 illustrating the ADC code $Code_{curr}$, and curve 404 illustrating the baseline code $CODE_{base}$, according to an embodiment of the present invention. As shown in FIG. 4, in some embodiments, curve 404 is the filtered version of curve 402. In some embodiments, baseline code $Code_{base}$ may be generated, e.g., by filtering/processing the ADC code $Code_{curr}$ in other ways.

In some embodiments, threshold code $CODE_{ref}$ is determined based on the baseline code $CODE_{base}$. For example, in some embodiments, threshold code $CODE_{ref}$ may be given by $$Code_{ref} = Code_{base} - Code_{offset} \qquad (1)$$

where $Code_{offset}$ is a (e.g., fixed) offset code.

It is possible that baseline code $CODE_{base}$ may become distorted, e.g., as a result of noise, for example. For example, when a phone having a touch screen is connected to mains for charging, noise associated with the charger charging the phone may cause a (e.g., rapid) change in ADC code $Code_{curr}$ and baseline code $CODE_{base}$. Such change in the baseline code $CODE_{base}$ may cause the unintentional detection of ghost touches (since the distance between the baseline code $CODE_{base}$ associated with a given touch cell and the ADC code $Code_{curr}$ of the given touch cell may differ by mode than the predetermined offset $Code_{offset}$. To avoid such ghost touch detections, some embodiments reset the baseline code $Code_{base}$ to the current ADC code $Code_{curr}$, e.g., when the baseline code $Code_{base}$ is determined to be distorted.

Figure 5:
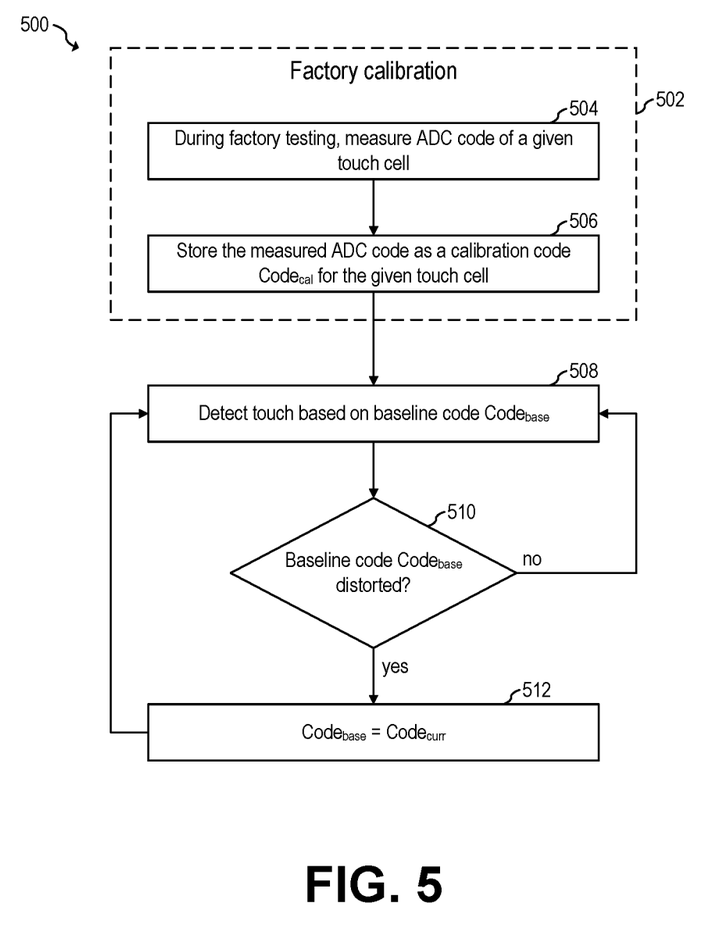
FIG. 5 shows a flow chart of an embodiment method for resetting a baseline code of a given touch cell of a grid of a touch screen, according to an embodiment of the present invention.

FIG. 5 shows a flow chart of embodiment method 500 for resetting a baseline code $Code_{base}$ of a given touch cell of a grid of a touch screen, according to an embodiment of the present invention. In some embodiments, method 500 may be performed for each touch cell of the grid of the touch screen.

During step 502, factory calibration is performed on a touch screen having a grid of touch cells. Factory calibration may be performed, for example, during manufacturing and testing of the touch screen.

In some embodiments, step 502 includes steps 504 and 506. For example, in some embodiments, for each touch cell of the grid of the touch screen, the ADC code $ADC_{curr}$ is measured during step 504 and stored in a non-volatile memory of the touch screen as calibration code $Code_{cal}$ during step 506.

During step 508, a touch screen controller may determine whether a given touch cell of the grid of the touch screen is experiencing a touch (e.g., by a finger or stylus). For example, in some embodiments, a touch is detected when the ADC code $ADC_{curr}$ of the given touch cell deviates from a baseline code $Code_{base}$ by more than an offset $Code_{offset}$. In some embodiments, the baseline code $Code_{base}$ is determined based on the history of ADC codes $ADC_{curr}$ associated with the given touch cell, such as by filtering, such as low-pass filtering, the ADC codes $ADC_{curr}$ associated with the given touch cell.

During step 510, the touch screen controller determines whether the baseline code is distorted. For example, in some embodiments, the touch screen controller determines whether the baseline code is distorted based on the ADC code $ADC_{curr}$, the baseline code $ADC_{base}$, and the calibration code $ADC_{cal}$. For example, in some embodiments, even with environmental changes, the ADC code $Code_{curr}$ stays within a predetermined code window of calibration code $Code_{cal}$ when there is no touch. In some embodiments, such predetermined code window is smaller than the offset code $Code_{offset}$. In some embodiments, when the ADC code $Code_{curr}$ is within the predetermined window of calibration code $Code_{cal}$, and the baseline code $Code_{base}$ deviates from the ADC code $Code_{curr}$ by more than the offset code $Code_{offset}$, it is determined that the baseline code $Code_{base}$ is distorted. In some embodiments, the determination that the baseline code $Code_{base}$ is distorted may be performed in additional and/or different ways.

If it is determined during step 510 that the baseline code $Code_{base}$ is distorted (output "yes"), the baseline code $Code_{base}$ is reset to the ADC code $Code_{curr}$.

Figure 6A:
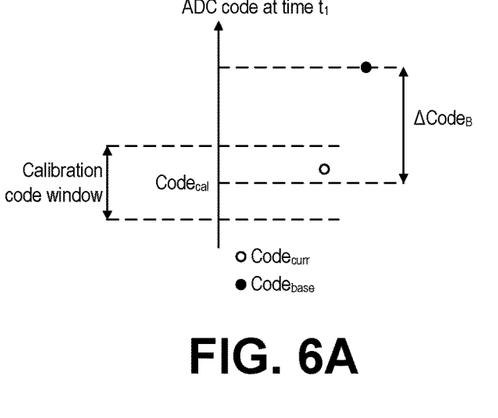
FIGS. 6A and 6B illustrate distorted and reset baseline codes, respectively, according to an embodiment of the present invention.
Figure 6B:
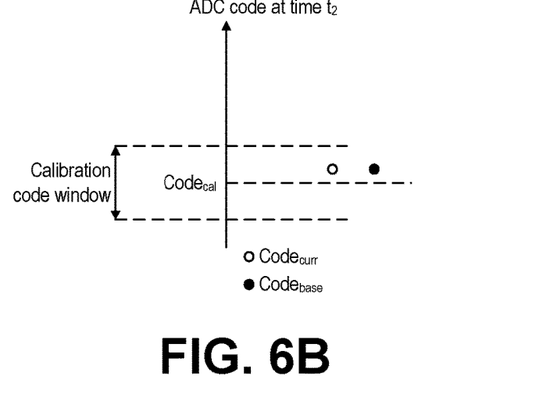

FIGS. 6A and 6B illustrate distorted and reset baseline codes $Code_{base}$, respectively, according to an embodiment of the present invention.

As shown in FIG. 6A illustrates, at time $t_1$, baseline code Codebase is determined to be distorted (e.g., output "yes" in step 510) since the ADC code Codecurr is within the calibration code window, and the baseline code Codebase deviates from calibration code Codecal by ΔCodeB, which is more than a predetermined baseline code threshold.

In response, the touch screen controller reset the baseline code $Code_{base}$ to be equal to the ADC code $Code_{curr}$ (e.g., during step 512) during time $t_2$, as shown in FIG. 6B.

It is possible that, e.g., due to aging, the capacitances and/or resistances (and/or other characteristics) of the touch screen change. Thus, the ADC code of one or more touch cells when there is no touch activity may drift outside the calibration window. For example, FIG. 7 shows the ADC code $Code_{curr}$ and baseline code $Code_{base}$ associated with a given touch cell at a particular time $t_3$, according to an embodiment of the present invention.

Figure 7:
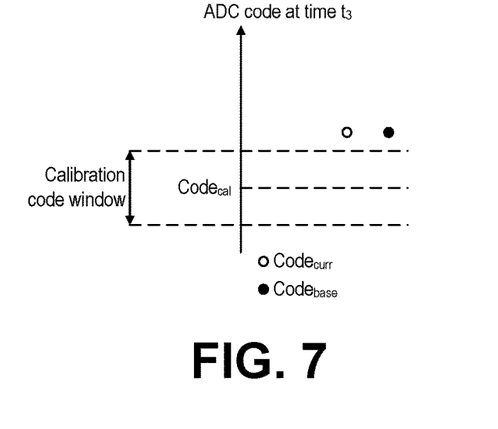
FIGS. 7 and 8 show the ADC and baseline codes associated with a given touch cell at particular times, according to an embodiment of the present invention.

As shown in FIG. 7, it is possible, e.g., due to aging of the touch screen, for a given touch cell to have an ADC code $Code_{curr}$ outside the calibration window when there is no touch event associated with the given touch cell. In the example illustrated in FIG. 7, the baseline code $Code_{base}$ is the same as the ADC code $Code_{curr}$ and, therefore, no touch is detected at the particular time $t_3$. If under the conditions illustrated in FIG. 7, $Code_{curr}$ were to deviate from $Code_{base}$ by more than $Code_{offset}$ in response to a touch, such touch would be detected.

It is possible for the baseline code $Code_{base}$ to deviate (e.g., due to noise) from the ADC code $Code_{curr}$ without a touch event, and cause a ghost detection. For example, FIG. 8 shows the ADC code $Code_{curr}$ and baseline code $Code_{base}$ associated with a given touch cell at a particular time $t_4$, according to an embodiment of the present invention.

Figure 8:
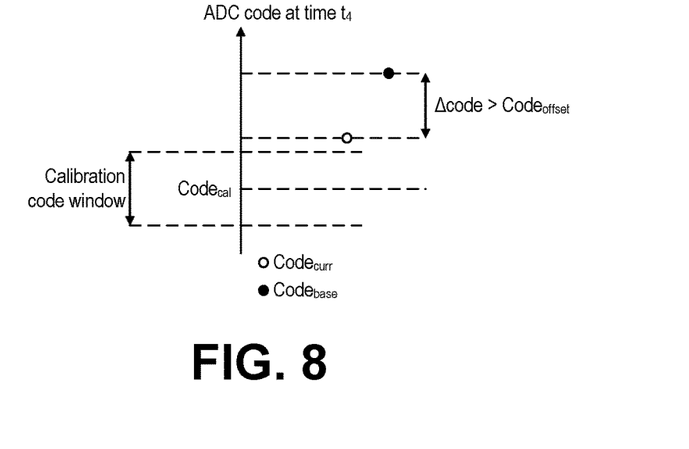

As shown in FIG. 8, since the difference between $Code_{base}$ and $Code_{curr}$ is higher than the offset $Code_{offset}$, a ghost touch is detected. In the example illustrated in FIG. 8, since the ADC code $Code_{curr}$ is outside the calibration window, the output of step 510 is "no" and the baseline code $Code_{base}$ is not reset.

A way to solve possible ghost touch detections when the characteristics of the touch screen change (e.g., due to aging) and result in no-touch codes $Code_{curr}$ of one or more touch cells that deviate significantly from the respective calibration code $Code_{cal}$, is to rewrite the respective calibration codes $Code_{cal}$.

After-market calibration may be challenging to perform as operator mistake, an accidental touch of the touch screen, and/or the presence of conductive object materials near the touch screen may cause the calibration codes Codecal to be rewritten with erroneous values (which may degrade the performance or render unusable the touch screen).

In an embodiment of the present invention, calibration of a touch screen is performed after-market with lower or negligible risk of rewriting the calibration codes $Code_{cal}$ with erroneous values. In some embodiments, during the calibration of the touch screen, unwanted touches of the touch screen are detected and, in response, the calibration is aborted/restarted.

Figure 9:
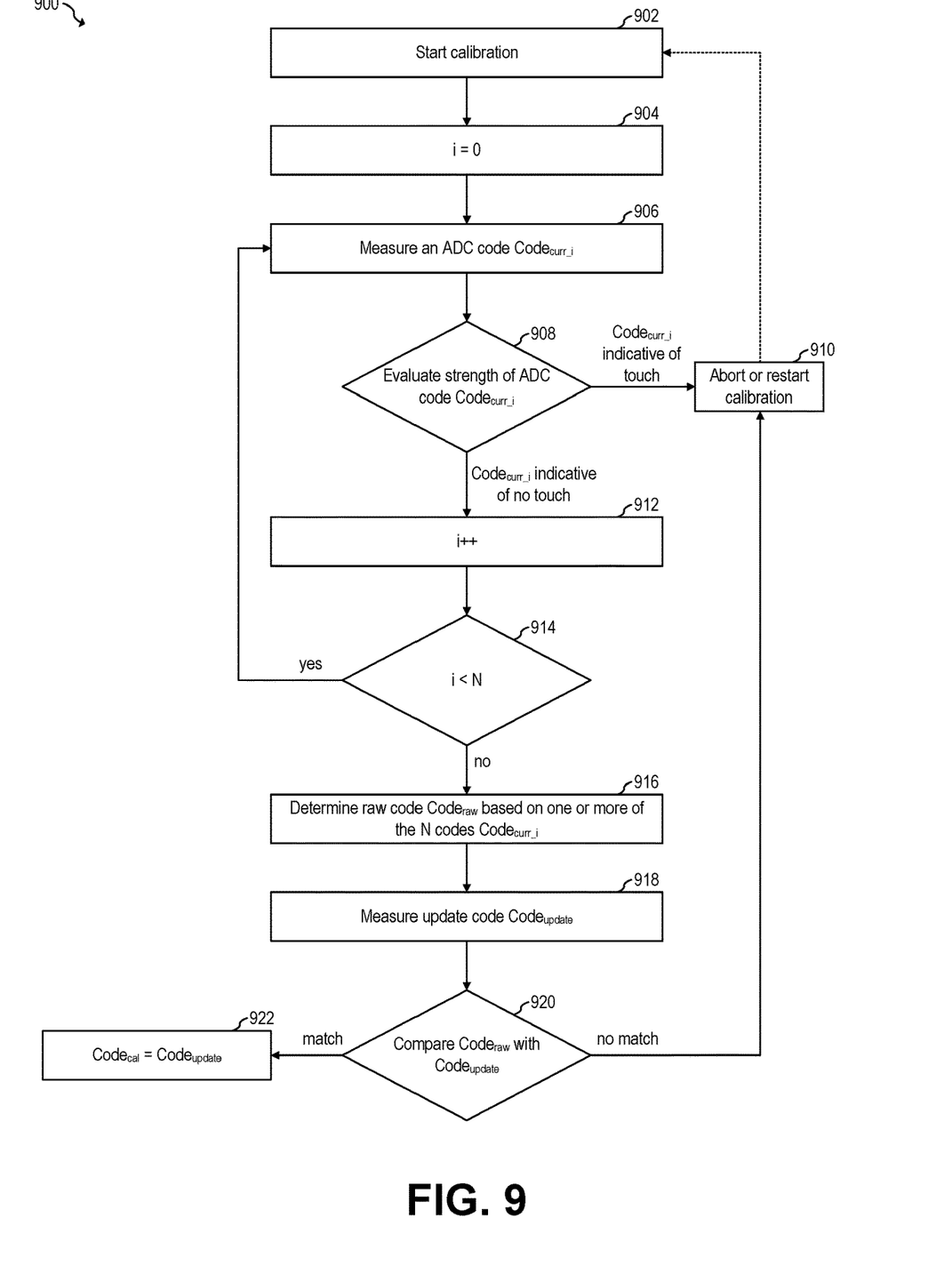
FIG. 9 shows a flow chart of an embodiment method for calibrating a touch cell of a grid of a touch screen, according to an embodiment of the present invention.

FIG. 9 shows a flow chart of embodiment method 900 for calibrating a touch cell of a grid of a touch screen, according to an embodiment of the present invention. Method 900 may be performed for each touch cell of the grid of the touch screen (e.g., sequentially, in parallel, or a combination thereof).

During step 902, calibration is started. In some embodiments, calibration of a touch screen of a device is triggered by a user of the device. For example, in some embodiments, a user of a phone may trigger calibration by launching an app of the phone (and, e.g., pressing a button associated with the app). In some embodiments, the user of the device may trigger the calibration, e.g., after the user notices that the device is experiencing ghost touches.

As illustrated by steps 904, 906, 908, 912, and 914, N measurements of ADC code $Code_{curr\_i}$ associated with a given touch cell are attempted, where N is a positive integer greater than or equal to 1, and i represents an index. For example, in some embodiments N is equal to 3.

If during step 908 it is determined that one of the N measurements is indicative that a touch of the given touch cell has occurred (e.g., based on the strength/value of ADC code $Code_{curr\_i}$), the calibration is aborted or restated during step 910.

In some embodiments, the determination (during step 908) that a touch has occurred during measurement of ADC code $Code_{curr\_i}$ is based on the value (also referred to a strength) of $Code_{curr\_i}$. For example, in some embodiments, if $Code_{curr\_i}$ deviates from the baseline code $Code_{base}$ by more than a predetermined value, then it is determined that $Code_{curr\_i}$ is indicative of a touch and step 910 is performed. In some embodiments, if $Code_{curr\_i}$ deviates from other $Code_{curr\_i}$ measured before by more than a predetermined value, then it is determined that a touch has occurred and step 910 is performed.

In some embodiments, an error message is displayed in the touch screen and/or some other error indication (e.g., sound, etc.) is triggered during step 910.

Once N code measurements of ADC code $Code_{curr\_i}$ are performed without a touch indication, a raw code $Code_{raw}$ is determined during step 916 based on one or more of the N ADC codes $Code_{curr\_i}$. For example, in some embodiments, $Code_{raw}$ is equal to the first ADC code measured $Code_{curr\_0}$. In some embodiments, $Code_{raw}$ is equal to the last ADC code measured $Code_{curr\_N-1}$. In some embodiments, $Code_{raw}$ is equal to the average ADC code measured during step 908. In some embodiments, $Code_{raw}$ is equal to the median ADC code measured during step 908. Other implementations are also possible.

During step 918, a new measurement of the ADC code is performed and referred to as update code $Code_{update}$. If it is determined that $Code_{raw}$ and $Code_{update}$ match, then the calibration code $Code_{cal}$ is rewritten with the value of update code $Code_{update}$ during step 922.

In some embodiments, determining whether $Code_{raw}$ and $Code_{update}$ match includes determining whether $Code_{update}$ deviates from $Code_{raw}$ by less than a predetermined code (e.g., 2, 3, 4, etc.). In some embodiments, determining whether $Code_{raw}$ and $Code_{update}$ match includes determining whether $Code_{update}$ is equal to $Code_{raw}$.

In some embodiments, updating the calibration code $Code_{cal}$ (during step 922) involves rewriting the calibration code $Code_{cal}$ with the value of the update code $Code_{update}$ (as shown in FIG. 9). In some embodiments, updating the calibration updating the calibration code $Code_{cal}$ (during step 922) involves rewriting the calibration code $Code_{cal}$ with the value of the raw code $Code_{raw}$. In some embodiments, updating the calibration updating the calibration code $Code_{cal}$ (during step 922) involves rewriting the calibration code $Code_{cal}$ based on the raw code $Code_{raw}$ and the update code $Code_{update}$ (such as rewriting the calibration code $Code_{cal}$ with the average of $Code_{cal}$ and $Code_{update}$).

Advantages of some embodiments include the ability to perform after-market calibration of a touch screen or touch panel in an easy and simple manner without in-person visiting to a service center. Some embodiments advantageously ensure complete calibration with latest touch screen/touch panel characteristics to achieve stable touch operation.

Figure 10:
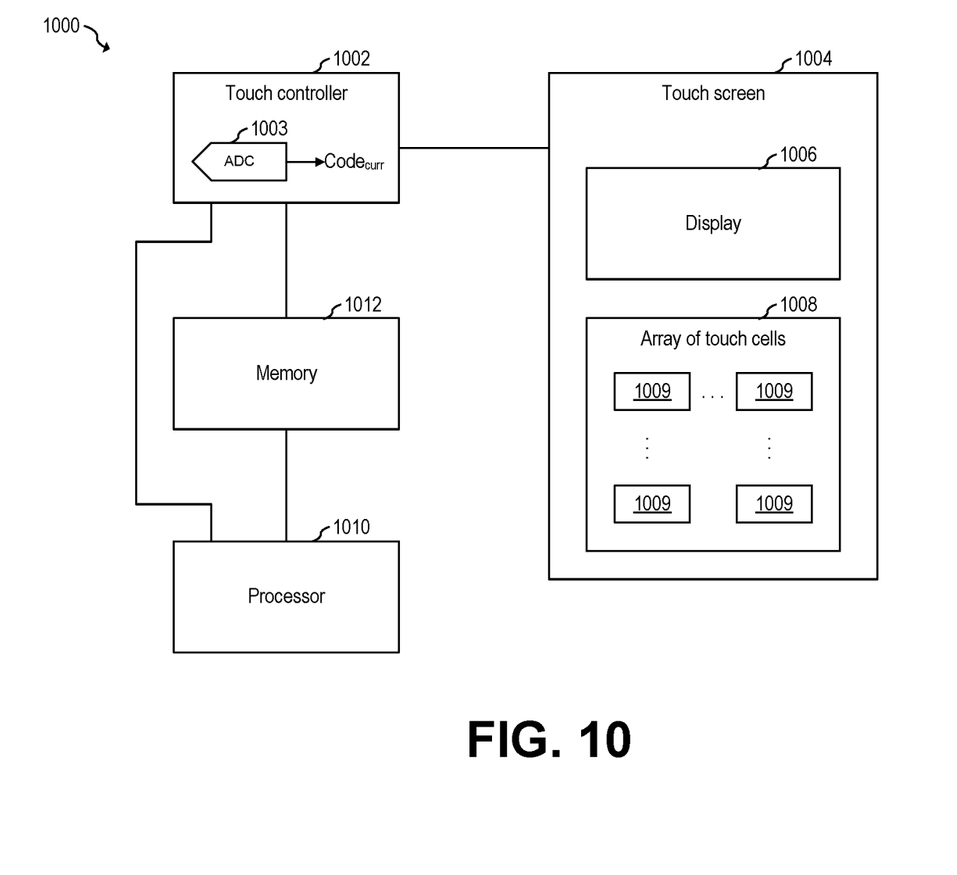
FIG. 10 shows a schematic diagram of a device, according to an embodiment of the present invention.

FIG. 10 shows a schematic diagram of device 1000, according to an embodiment of the present invention. Device moo includes touch controller 1002, touch screen 1004, memory 1012, and processor 1010. Touch screen 1004 includes display 1006, and array of touch cells 1008 (also referred to as grid or touch grid).

During normal operation touch controller 1002 controls the operation of touch screen 1004. For example, in some embodiments, touch controller performs step 508 for detecting a touch. In some embodiments, touch controller also performs steps 510 and 512 to dynamically adjust the baseline code $Code_{base}$, e.g., to improve performance during environmental changes.

In some embodiments, touch controller 1002 includes an ADC (1003) for generating in a known manner the ADC code $Code_{curr}$ for one or more (or all) touch cells 1009. In some embodiments, touch controller 1002 includes a plurality of ADCs 1003 for generating the ADC codes $Code_{curr}$ for respective portions of the array 1008. In some embodiments, the ADC 1003 may be external to touch controller 1002.

In some embodiments, touch controller 1002 may be implemented in any way known in the art.

Display 1006 is configured to display images. Display 1006 may be implemented in any way known in the art.

In some embodiments, error messages triggered during step 910 may be displayed in display 1006. In some embodiments, step 902 may be triggered by interacting (e.g., touching) array of touch cells 1008.

Array of touch cells 1008 include a plurality of touch cells 1009 arranged in rows and columns. Touch cells 1009 and the array of touch cells 1008 may be implemented in any way known in the art.

Memory 1012 is configured to store the baseline codes $Code_{base}$, and calibration codes $Code_{cal}$ for each of the touch cells 1009. Memory 1012 may include volatile and non-volatile memory cells. For example, in some embodiments, memory 1012 includes non-volatile memory cells for storing calibration codes $Code_{cal}$ and non-volatile memory cells for storing baseline codes $Code_{base}$. In some embodiments, memory 1012 is part of processor 1010. In some embodiments, memory 1012 is external to processor 1010 (such as inside touch controller 1002). Other implementations are also possible.

In some embodiments, codes $Code_{curr\_i}$ and $Code_{update}$ are (e.g., temporarily) stored in memory 1012 during performance of method 900.

In some embodiments, memory 1012 may also be used for storing other types of data of device 1000.

In some embodiments, the factory calibration (step 502) stores the calibration codes $Code_{cal}$ in read-only memory. In some such embodiments, performing method 900 includes storing the calibration codes $Code_{cal}$ in a different (e.g., non-volatile, e.g., flash) memory and causing touch controller 1002 to retrieve the calibration codes $Code_{cal}$ from the different memory during normal operation (e.g., while performing step 510).

Processor 1010 is configured to perform or cause to be performed one or more (or all) steps of method 900. In some embodiments, processor 1010 is implemented as a general purpose or custom controller or processor coupled to a memory and configured to execute instructions from the memory. In some embodiments, processor 1010 is implemented as part of touch controller 1002.

In some embodiments, processor 1010 may also perform other functions of device 1000.

In some embodiments, device moo is a smart phone, tablet, laptop, or any other device that includes a touch screen, such as a smart thermostat, a refrigerator, car infotainment console, etc.

Example embodiments of the present invention are summarized here. Other embodiments can also be understood from the entirety of the specification and the claims filed herein.

Example 1. A method including performing a calibration of a first touch cell of a touch screen, where performing the calibration includes: receiving a first code associated with the first touch cell; receiving a second code associated with the first touch cell; determining whether there is an indication of a touch of the touch screen based on the first and second codes; generating a raw code based on the first or second codes; receiving a third code associated with the first touch cell; determining whether the third code matches the raw code; and in response to determining that there is no indication of a touch of the touch screen based on the first and second codes, and that the third code matches the raw code, updating a calibration code associated with the first touch cell based on the raw code or the third code.

Example 2. The method of example 1, further including, after performing the calibration of the first touch cell: generating a baseline code associated with the first touch cell; receiving a fourth code associated with the first touch cell; and when the fourth code deviates from the baseline code by more than a predetermined value, detecting a touch of the first touch cell.

Example 3. The method of one of examples 1 or 2, further including updating the baseline code based on the fourth code.

Example 4. The method of one of examples 1 to 3, further including: receiving a fifth code associated with the first touch cell; determining whether the baseline code is distorted based on the fifth code and the calibration code; and in response to determining that the baseline code is distorted, rewriting the baseline code with the fifth code.

Example 5. The method of one of examples 1 to 4, where, before receiving the first code, the calibration code associated with the first touch cell is stored in read-only memory, and where updating the calibration code associated with the first touch cell includes storing the updated calibration code in a non-volatile memory different from the read-only memory.

Example 6. The method of one of examples 1 to 5, where updating the calibration code associated with the first touch cell includes updating the calibration code associated with the first touch cell based on the raw code and the third code.

Example 7. The method of one of examples 1 to 6, where generating the raw code includes generating the raw code based on the first and second codes.

Example 8. The method of one of examples 1 to 7, where performing the calibration of the first touch cell further includes receiving a further code associated with the first touch cell, where updating the calibration code associated with the first touch cell includes updating the calibration code associated with the first touch cell in response to determining that there is no indication of a touch of the touch screen based on the first, second, and further codes.

Example 9. The method of one of examples 1 to 8, where performing the calibration of the first touch cell further includes, in response to determining that there is an indication of a touch of the touch screen based on the first or second codes, displaying an error message in a display of the touch screen.

Example 10. The method of one of examples 1 to 9, where performing the calibration of the first touch cell further includes, in response to determining that there is an indication of a touch of the touch screen based on the first or second codes, aborting the performance of the calibration of the first touch cell.

Example 11. The method of one of examples 1 to 10, where determining whether there is an indication of a touch of the touch screen includes comparing the second code with a threshold code.

Example 12. The method of one of examples 1 to 11, where the threshold code is based on the first code.

Example 13. The method of one of examples 1 to 12, where performing the calibration of the first touch cell further includes generating the first code using an analog-to-digital converter (ADC), where, before performing the calibration of the first touch cell, generating a baseline code based on an output of the ADC, and where the threshold code is based on the baseline code.

Example 14. The method of one of examples 1 to 13, where determining whether the third code matches the raw code includes determining whether the third code is within a code range that includes the raw code, and where determining that the third code matches the raw code includes determining that the third code is within the code range.

Example 15. The method of one of examples 1 to 14, where the code range includes a plurality of sequential codes.

Example 16. The method of one of examples 1 to 15, where the touch screen includes an array of touch cells arranged in rows and columns, and where the array of touch cells includes the first touch cell, the method further including performing a calibration of all touch cells of the array of touch cells.

Example 17. A device including: a touch screen that includes an array of touch cells; and a controller configured to perform a calibration of a first touch cell of the array, where performing the calibration includes: receiving a first code associated with the first touch cell, receiving a second code associated with the first touch cell, determining whether there is an indication of a touch of the touch screen based on the first and second codes, generating a raw code based on the first or second codes, receiving a third code associated with the first touch cell, determining whether third code matches the raw code, and in response to determining that there is no indication of a touch of the touch screen based on the first and second codes, and that the third code matches the raw code, updating a calibration code associated with the first touch cell based on the raw code or the third code.

Example 18. The device of example 17, where the device is a smartphone, tablet, or laptop.

Example 19. The device of one of examples 17 or 18, further including a non-volatile memory external to the controller, where the controller is configured to store the updated calibration code in the non-volatile memory.

Example 20. A system configured to be coupled to a touch screen that includes an array of touch cells, the system including: a memory; and a controller configured to perform a calibration of a first touch cell of the array, where performing the calibration includes: receiving a first code associated with the first touch cell, receiving a second code associated with the first touch cell, determining whether there is an indication of a touch of the touch screen based on the first and second codes, generating a raw code based on the first or second codes, receiving a third code associated with the first touch cell, determining whether the third code matches the raw code, and in response to determining that there is no indication of a touch of the touch screen based on the first and second codes, and that the third code matches the raw code, updating a calibration code associated with the first touch cell based on the raw code or the third code, and storing the updated calibration code in the memory.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for calibrating a first touch cell of a touch screen, the method comprising:
    receiving, by a controller coupled to the touch screen, a
        first code associated with the first touch cell;

receiving, by the controller, a second code associated with the first touch cell;

determining, by the controller, whether there is an indication of a touch of the touch screen based on the first and second codes;

generating, by the controller, a raw code based on the first or second codes;

receiving, by the controller, a third code associated with the first touch cell;

determining, by the controller, whether the third code matches the raw code; and in response to determining, by the controller, that there is no indication of a touch of the touch screen based on the first and second codes, and that the third code matches the raw code, updating, by the controller, a calibration code associated with the first touch cell based on the raw code or the third code.

2. The method of claim 1, further comprising, after calibrating the first touch cell:

generating, by the controller, a baseline code associated with the first touch cell;

receiving, by the controller, a fourth code associated with the first touch cell; and detecting, by the controller, a touch of the first touch cell in response to the fourth code deviating from the baseline code by more than a predetermined value.

3. The method of claim 2, further comprising updating the baseline code based on the fourth code.

4. The method of claim 2, further comprising:

receiving, by the controller, a fifth code associated with the first touch cell;

determining, by the controller, whether the baseline code is distorted based on the fifth code and the calibration code; and rewriting, by the controller, the baseline code with the fifth code in response to determining that the baseline code is distorted.

5. The method of claim 1, wherein, before receiving the first code, the calibration code associated with the first touch cell is stored in a read-only memory, and wherein updating the calibration code associated with the first touch cell comprises storing the updated calibration code in a non-volatile memory different from the read-only memory.

6. The method of claim 1, wherein updating the calibration code associated with the first touch cell comprises updating the calibration code associated with the first touch cell based on the raw code and the third code.

7. The method of claim 1, wherein generating the raw code comprises generating the raw code based on the first and second codes.

8. The method of claim 1, further comprising receiving, by the controller, a further code associated with the first touch cell, wherein updating the calibration code associated with the first touch cell comprises updating, by the controller, the calibration code associated with the first touch cell in response to determining that there is no indication of a touch of the touch screen based on the first, second, and further codes.

9. The method of claim 1, further comprising displaying, by the controller, an error message in a display of the touch screen in response to determining that there is an indication of a touch of the touch screen based on the first or second codes.

10. The method of claim 1, further comprising aborting, by the controller, calibration of the first touch cell in response to determining that there is an indication of a touch of the touch screen based on the first or second codes.

11. The method of claim 1, wherein determining whether there is an indication of a touch of the touch screen comprises comparing, by the controller, the second code with a threshold code.

12. The method of claim 11, wherein the threshold code is based on the first code.

13. The method of claim 11, further comprising:

generating, by an analog-to-digital converter (ADC) coupled to the touch screen and the controller, the first code; and generating a baseline code based on an output of the ADC before calibrating the first touch cell, wherein the threshold code is based on the baseline code.

14. The method of claim 1, wherein determining whether the third code matches the raw code comprises determining, by the controller, whether the third code is within a code range that comprises the raw code, and wherein determining that the third code matches the raw code comprises determining, by the controller, that the third code is within the code range.

15. The method of claim 14, wherein the code range comprises a plurality of sequential codes.

16. The method of claim 1, wherein the touch screen comprises an array of touch cells arranged in rows and columns, and wherein the array of touch cells comprises the first touch cell, the method further comprising performing a calibration of all touch cells of the array of touch cells.

17. A device, comprising:

a touch screen that comprises an array of touch cells; and a controller coupled to the touch screen, wherein the controller, to calibrate a first touch cell of the array, is configured to:

receive a first code associated with the first touch cell, receive a second code associated with the first touch cell, determine whether there is an indication of a touch of the touch screen based on the first and second codes, generate a raw code based on the first or second codes, receive a third code associated with the first touch cell, determine whether the third code matches the raw code, and in response to determining that there is no indication of a touch of the touch screen based on the first and second codes, and that the third code matches the raw code, update a calibration code associated with the first touch cell based on the raw code or the third code.

18. The device of claim 17, wherein the device is a smartphone, tablet, or laptop.

19. The device of claim 17, further comprising a non-volatile memory external to the controller, wherein the controller is configured to store the updated calibration code in the non-volatile memory.

20. A system configured to be coupled to a touch screen that comprises an array of touch cells, the system comprising:

a memory; and a controller coupled to the memory, wherein the controller, to calibrate a first touch cell of the array, is configured to:

receive a first code associated with the first touch cell, receive a second code associated with the first touch cell, determine whether there is an indication of a touch of the touch screen based on the first and second codes, generate a raw code based on the first or second codes, receive a third code associated with the first touch cell, determine whether the third code matches the raw code, and in response to determining that there is no indication of a touch of the touch screen based on the first and second codes, and that the third code matches the raw code, update a calibration code associated with the first touch cell based on the raw code or the third code, and storing the updated calibration code in the memory.

\* \* \* \* \*